US012634205B2

(12) United States Patent
Kumar et al.

(10) Patent No.: US 12,634,205 B2
(45) Date of Patent: May 19, 2026

(54) SYSTEMS AND METHODS OF PARAMETER SET CONFIGURATION AND DOWNLOAD

(71) Applicant: QUALCOMM Incorporated, San Diego, CA (US)

(72) Inventors: Rajeev Kumar, San Diego, CA (US); Xipeng Zhu, San Diego, CA (US); Gavin Bernard Horn, La Jolla, PA (US); Aziz Gholmieh, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 529 days.

(21) Appl. No.: 17/891,974

(22) Filed: Aug. 19, 2022

(65) Prior Publication Data

US 2024/0064065 A1 Feb. 22, 2024

(51) Int. Cl.
*H04L 41/16* (2022.01)
*H04W 76/11* (2018.01)
(52) U.S. Cl.
CPC ............. *H04L 41/16* (2013.01); *H04W 76/11* (2018.02)
(58) Field of Classification Search
CPC .......... G06N 20/00; G06N 3/045; G06N 3/08; G06N 3/048; G06N 3/02; G06N 3/096; G06N 3/092; H04L 1/0009; H04L 41/16; H04L 67/12; H04L 63/1416; H04L 63/1425
See application file for complete search history.

(56) References Cited

U.S. PATENT DOCUMENTS

2020/0045615 A1* 2/2020 Karimli ................. H04W 48/08
2022/0342713 A1 10/2022 Shen et al.
2023/0389057 A1* 11/2023 Deenoo ................. H04W 72/50

FOREIGN PATENT DOCUMENTS

WO 2021142609 A1 7/2021
WO 2022086984 A1 4/2022

OTHER PUBLICATIONS

International Search Report and Written Opinion—PCT/US2023/072413—ISA/EPO—Dec. 18, 2023.

* cited by examiner

*Primary Examiner* — Yee F Lam
(74) *Attorney, Agent, or Firm* — ArentFox Schiff, LLP

(57) ABSTRACT

Example implementations include a method, apparatus and computer-readable medium of wireless communication by a user equipment (UE), comprising receiving parameter set configuration information from a network entity, the parameter set configuration information corresponding to a model structure employed in a machine learning operation by the UE for the wireless communication. The implementations further include activating a parameter set in response to an activation condition, the parameter set identified within the parameter set configuration information as being associated with the activation condition.

28 Claims, 14 Drawing Sheets

600

700

```
┌─────────────────┐      ┌─────────────────┐      ┌─────────────────┐
│     UE 504      │      │Network Entity 502│     │ Model Repository│
│                 │      │                 │      │      506        │
└────────┬────────┘      └────────┬────────┘      └────────┬────────┘
         │                        │                        │
         │  Receive ML Configuration 702                   │
         │◄───────────────────────│                        │
         │  (including PSs per MS ID)                       │
         │                        │                        │
         │  Retrieve PSs for MS IDs, if not available at the UE 704
         │◄─ ─ ─ ─ ─ ─ ─ ─ ─ ─ ─ ─│─ ─ ─ ─ ─ ─ ─ ─ ─ ─ ─ ►│
         │                        │                        │
         │     ML activation 706  │                        │
         │◄───────────────────────│                        │
         │   (e.g., MS A, PS 1)   │                        │
         │                        │                        │
┌────────┴────────┐               │                        │
│   UE activates  │               │                        │
│  MS A and PS 1  │               │                        │
│       708       │               │                        │
└────────┬────────┘               │                        │
         │                        │                        │
         │  Receive ML reconfiguration or PS               │
         │        switching 710   │                        │
         │◄───────────────────────│                        │
         │ (e.g., MS A, PS M or {PS M, PS K})              │
         │                        │                        │
         │  Retrieve PS M or δ = PS M – PS K, if not available at the UE 712
         │◄─ ─ ─ ─ ─ ─ ─ ─ ─ ─ ─ ─│─ ─ ─ ─ ─ ─ ─ ─ ─ ─ ─ ►│
         │                        │                        │
         │  Receive ML activation 714                      │
         │◄───────────────────────│                        │
         │  (e.g., MS A + PS M)   │                        │
         │                        │                        │
```

FIG. 7

800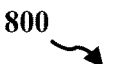

| UE 504 | Network Entity 502 | Model Repository 506 |
|---|---|---|

UE retrieves a subset PSs due to limited memory (at the UE) or UE may require new PSs resulting from change in condition/config C-Plane 804

Transmit UE assistance information (Condition, PS IDs) 802

Receive PS or {delta PS, reference PS ID} 806

U-Plane 810

Retrieve PS M or $\delta$ = PS M — PS K, if not available at the UE 808

U-Plane 814

Transmit UE assistance information (Condition, PS IDs) 812

Receive ML configuration (including required PS ID, {require PS ID (PS M), reference PS ID (PS M)}) 816

Retrieve PS M or $\delta$ = PS M — PS K, if not available at the UE 818

1000
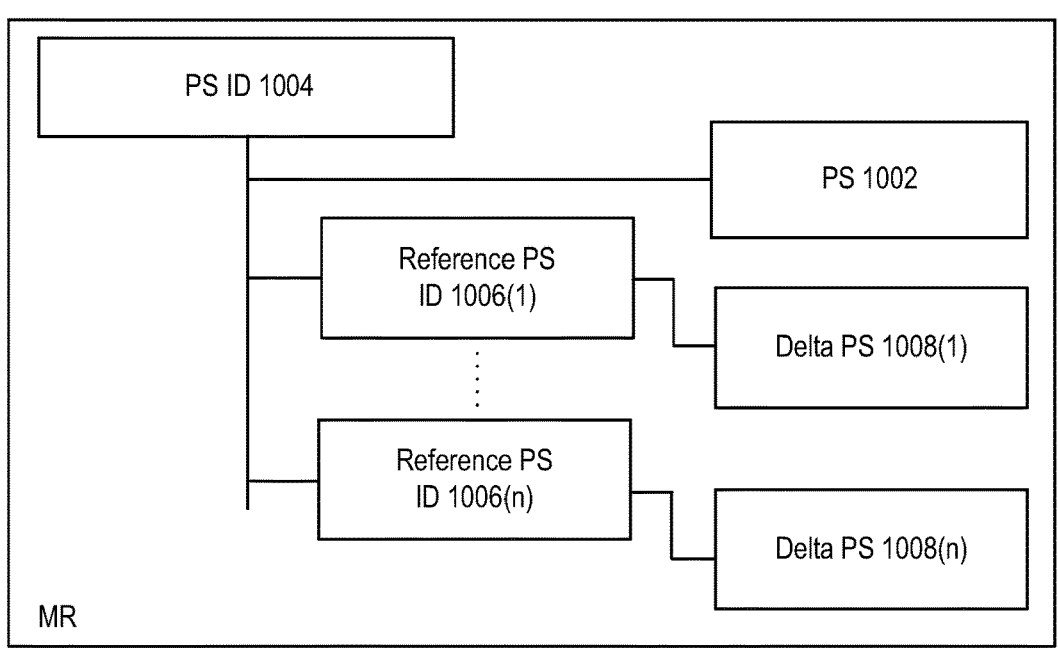
FIG. 10

Figure 12:
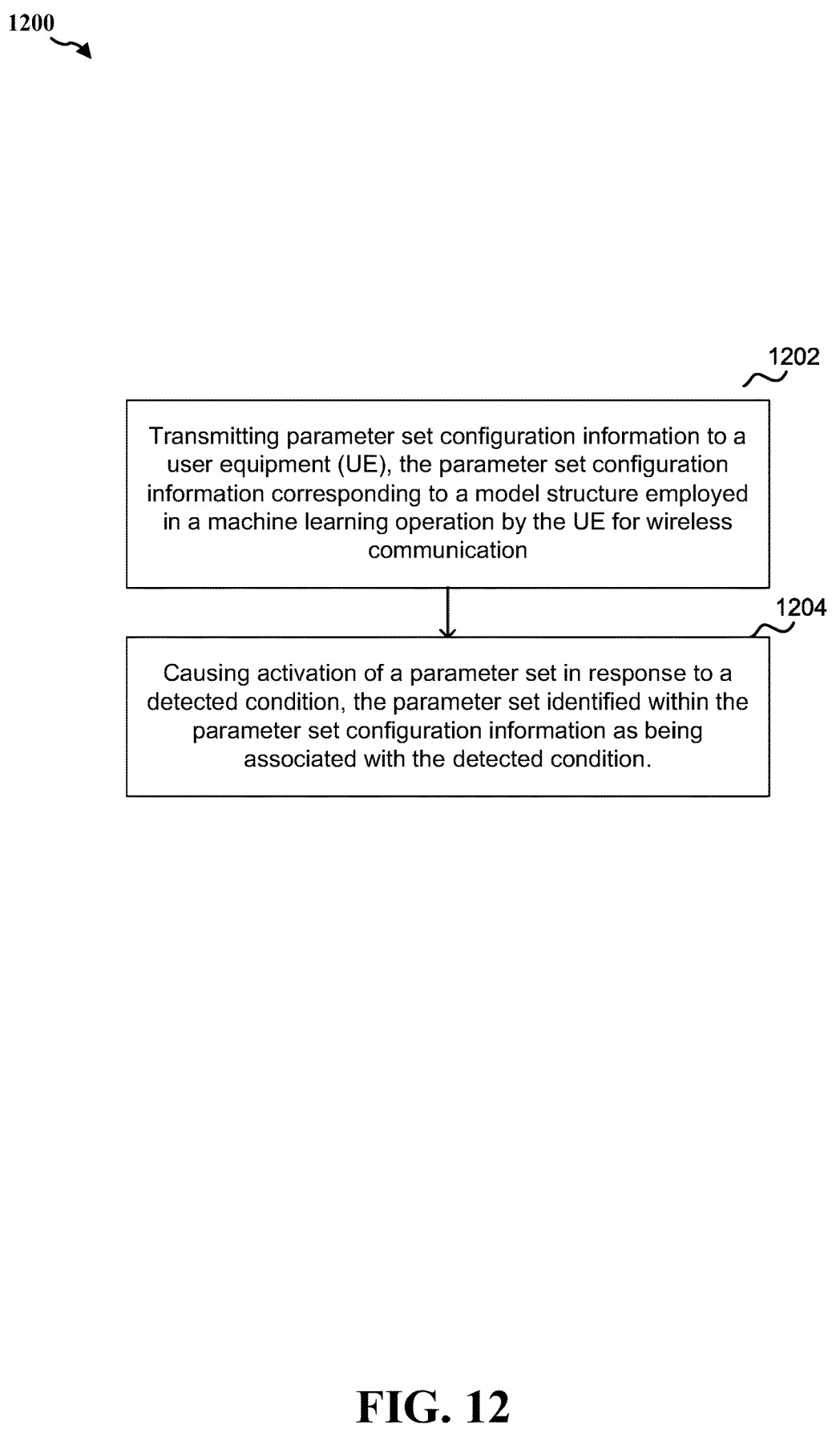

1200

1202

Transmitting parameter set configuration information to a user equipment (UE), the parameter set configuration information corresponding to a model structure employed in a machine learning operation by the UE for wireless communication

1204

Causing activation of a parameter set in response to a detected condition, the parameter set identified within the parameter set configuration information as being associated with the detected condition.

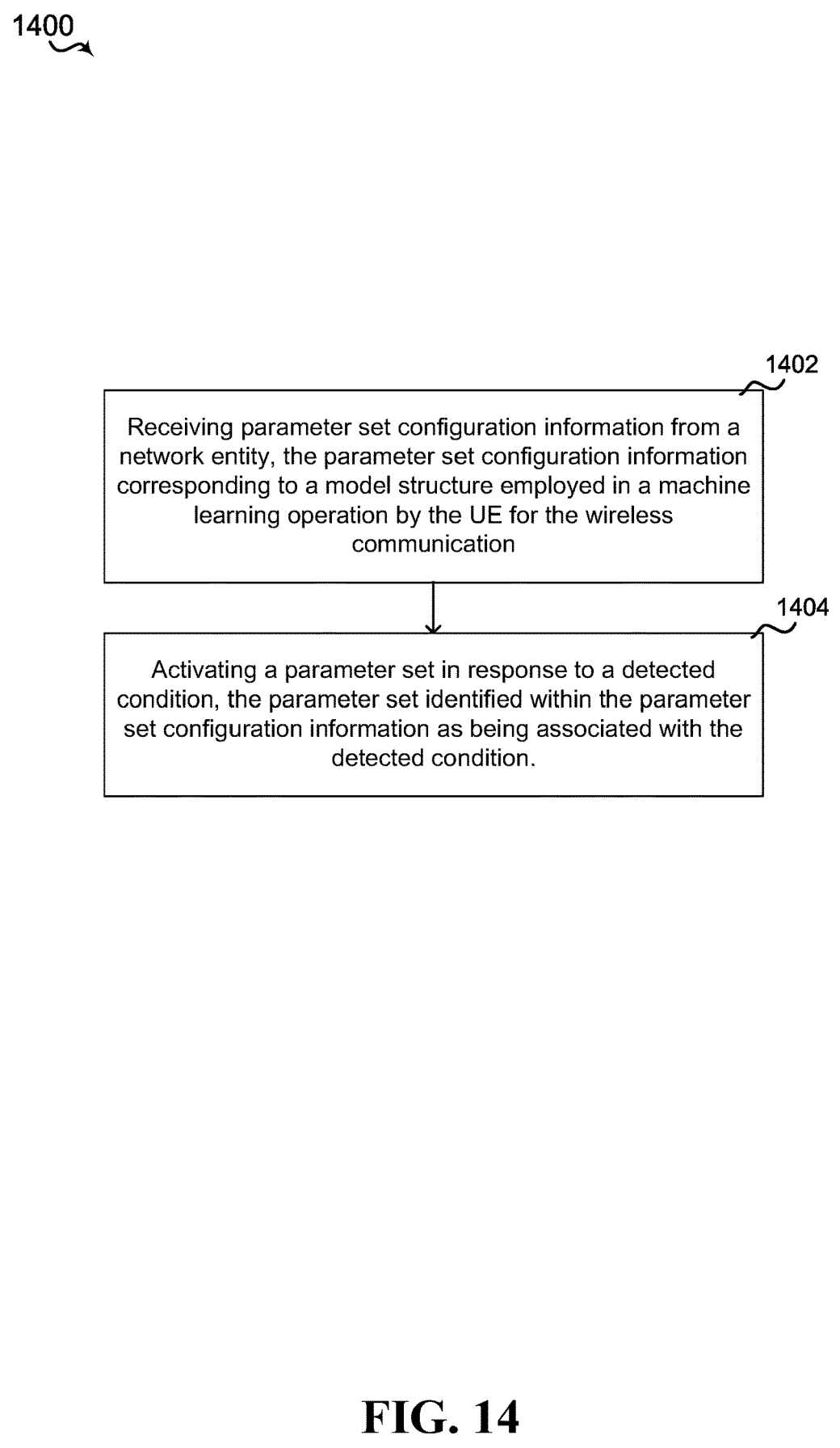

Receiving parameter set configuration information from a network entity, the parameter set configuration information corresponding to a model structure employed in a machine learning operation by the UE for the wireless communication

1404

Activating a parameter set in response to a detected condition, the parameter set identified within the parameter set configuration information as being associated with the detected condition.

FIG. 14

SYSTEMS AND METHODS OF PARAMETER SET CONFIGURATION AND DOWNLOAD

BACKGROUND

Technical Field

The present disclosure relates generally to wireless communication, and more particularly, implementing a procedure for parameter set configuration and download.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (such as with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

An example aspect includes a method of wireless communication by a user equipment (UE), comprising receiving parameter set configuration information from a network entity, the parameter set configuration information corresponding to a model structure employed in a machine learning operation by the UE for the wireless communication. The method further includes activating a parameter set in response to an activation condition, the parameter set identified within the parameter set configuration information as being associated with the activation condition.

Another example aspect includes a user equipment (UE) apparatus, comprising a memory and a processor coupled with the memory. The processor is configured to receive parameter set configuration information from a network entity, the parameter set configuration information corresponding to a model structure employed in a machine learning operation by the UE for the wireless communication. The processor is further configured to activate a parameter set in response to an activation condition, the parameter set identified within the parameter set configuration information as being associated with the activation condition.

Another example aspect includes a user equipment (UE) apparatus, comprising means for receiving parameter set configuration information from a network entity, the parameter set configuration information corresponding to a model structure employed in a machine learning operation by the UE for the wireless communication. The apparatus further includes means for activating a parameter set in response to an activation condition, the parameter set identified within the parameter set configuration information as being associated with the activation condition.

Another example aspect includes a computer-readable medium comprising stored instructions for wireless communication by a user equipment (UE), wherein the instructions are executable by a processor to receive parameter set configuration information from a network entity, the parameter set configuration information corresponding to a model structure employed in a machine learning operation by the UE for the wireless communication. The instructions are further executable to activate a parameter set in response to an activation condition, the parameter set identified within the parameter set configuration information as being associated with the activation condition.

An example aspect includes a method of wireless communication by a network entity, comprising transmitting parameter set configuration information to a user equipment (UE), the parameter set configuration information corresponding to a model structure employed in a machine learning operation by the UE for wireless communication. The method further includes causing activation of a parameter set in response to an activation condition, the parameter set identified within the parameter set configuration information as being associated with the activation condition.

Another example aspect includes an apparatus for wireless communication by a network entity, comprising a memory and a processor coupled with the memory. The processor is configured to transmit parameter set configuration information to a user equipment (UE), the parameter set configuration information corresponding to a model structure employed in a machine learning operation by the UE for wireless communication. The processor is further configured to cause activation of a parameter set in response to an activation condition, the parameter set identified within the parameter set configuration information as being associated with the activation condition.

Another example aspect includes an apparatus for wireless communication by a network entity, comprising means for transmitting parameter set configuration information to a user equipment (UE), the parameter set configuration information corresponding to a model structure employed in a machine learning operation by the UE for wireless communication. The apparatus further includes means for causing activation of a parameter set in response to an activation condition, the parameter set identified within the parameter set configuration information as being associated with the activation condition.

Another example aspect includes a computer-readable medium comprising stored instructions for wireless communication by a network entity, wherein the instructions are executable by a processor to transmit parameter set configuration information to a user equipment (UE), the parameter set configuration information corresponding to a model structure employed in a machine learning operation by the UE for wireless communication. The instructions are further executable to cause activation of a parameter set in response to an activation condition, the parameter set identified within the parameter set configuration information as being associated with the activation condition.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, wherein dashed lines may indicate optional elements, and in which:

FIG. 7 is a diagram illustrating an example of re-configuring parameter set information at a UE, in accordance with some aspects of the present disclosure.

FIG. 8 is a diagram illustrating an example of obtaining additional parameter set information at a UE, in accordance with some aspects of the present disclosure.

FIG. 10 is a diagram illustrating an example storage structure for storing parameter set information at a model repository, in accordance with some aspects of the present disclosure.

FIG. 12 is a flowchart of an example of a method of a method of wireless communication by a network entity.

FIG. 14 is a flowchart of an example of a method of a method of wireless communication by a UE.

DETAILED DESCRIPTION

Figure 1:
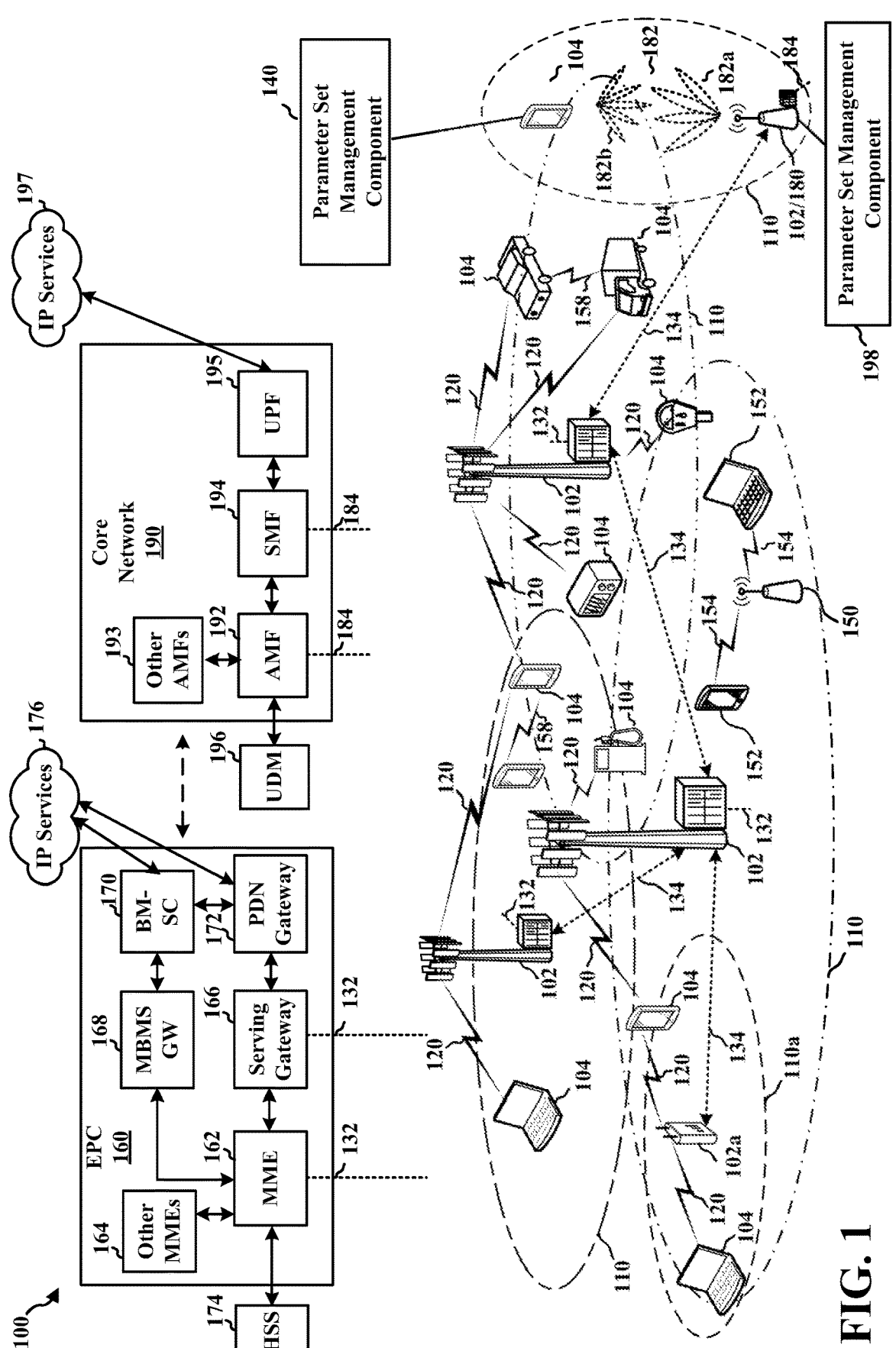
FIG. 1 is a diagram illustrating an example of a wireless communications system and an access network, in accordance with some aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to a person having ordinary skill in the art that these concepts may be practiced without these specific details. In some instances, structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, among other examples (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, among other examples, whether referred to as software, firmware, middleware, microcode, hardware description language, or otherwise.

Accordingly, in one or more examples, the functions described may be implemented in hardware, software, or any combination thereof. If implemented in software, the functions may be stored on or encoded as one or more instructions or code on a computer-readable medium. Computer-readable media includes computer storage media, which may be referred to as non-transitory computer-readable media. Non-transitory computer-readable media may exclude transitory signals. Storage media may be any available media that can be accessed by a computer. By way of example, and not limitation, such computer-readable media can include a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

Various implementations relate generally to a procedure for implementing parameter set configuration, update, switching, and download. In some aspects, a wireless device (e.g., a UE) may employ machine learning models to perform wireless communication. Machine learning models may be used to manage one or more device settings, perform different network layers (e.g., physical layer, MAC layer, RLC layer, PDCP layer, RRC layer, IP layer, transport layer, and application layer) procedures, and manage device configuration of a UE. For example, a machine learning model may be used to dynamically select device settings and configuration to manage battery performance, interference, beams, and antenna usage. In order to improve the performance of a machine learning model, different parameter sets may be employed by the UE for a machine learning based upon a state/condition of the UE or a network serving the UE. As used herein, in some aspects, a "parameter set" may refer to one or more coefficients or weights of a machine learning model. However, a device may incur significant signal overhead and utilize valuable storage space managing the different parameter sets for each machine learning model.

As such, in some aspects, a UE may be configured to efficiently configure and download parameter set information for machine learning models. As described in detail herein, a UE may receive parameter set information and activate a parameter set associated with the parameter set information based on a condition of the UE or a network serving the UE. In some aspects, a UE may only download parameter sets relevant to a detected condition or delta information corresponding to previously-acquired parameter set information. Accordingly, in some aspects, a UE may be configured with multiple performant parameter sets for a plurality of machine learning models, while reducing signaling overhead, minimizing air interface overhead, and preserving storage space within a device.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (for example, a 5G Core (5GC)). The base stations 102 may include macrocells (high power cellular base station) or small cells (low power cellular base station). The macrocells include base stations. The small cells include femtocells, picocells, and microcells.

In an aspect, a UE 104 may be an internet of things (IoT) device, e.g., an (eMTC) or (NB-IoT). Further, the UE 104 may include parameter set management component (PS MGMT Component) 140 configured to receive and employ parameter set configuration, update, or switching information received from a base station 102/180 and activate a parameter set associated with the parameter set configuration information based upon detection of an activation condition related to the parameter. Additionally, a base station 102/180 may include a parameter set management component (PS MGMT Component) 198 configured to transmit the parameter set configuration, update, or switching information to a UE 104, and manage download and activation of parameter sets associated with the parameter set configuration information.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (for example, an S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (for example, handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (for example, through the EPC 160 or core network 190) with each other over third backhaul links 134 (for example, X2 interface). The third backhaul links 134 may be wired or wireless.

The base stations 102 may wirelessly communicate with the UEs 104. Each of the base stations 102 may provide communication coverage for a respective geographic coverage area 100. There may be overlapping geographic coverage areas 100. For example, the small cell 102a may have a coverage area 100a that overlaps the coverage area 100 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 or downlink (DL) (also referred to as forward link) transmissions from a base station 102 to a UE 104. The communication links 120 may use multiple-input and multiple-output (MIMO) antenna technology, including spatial multiplexing, beamforming, or transmit diversity. The communication links may be through one or more carriers. The base stations 102/UEs 104 may use spectrum up to Y MHz (for example, 5, 10, 15, 20, 100, 400 MHz, among other examples) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (for example, more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Some UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.10 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102a may operate in a licensed or an unlicensed frequency spectrum. When operating in an unlicensed frequency spectrum, the small cell 102a may employ NR and use the same 5 GHz unlicensed frequency spectrum as used by the Wi-Fi AP 150. The small cell 102a, employing NR in an unlicensed frequency spectrum, may boost coverage to or increase capacity of the access network.

A base station 102, whether a small cell 102a or a large cell (for example, macro base station), may include or be referred to as an eNB, gNodeB (gNB), or another type of base station. Some base stations, such as gNB 180 may operate in one or more frequency bands within the electromagnetic spectrum. The electromagnetic spectrum is often subdivided, based on frequency/wavelength, into various classes, bands, channels, etc. In 5G NR two initial operating bands have been identified as frequency range designations FR1 (416 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" (mmW) band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band. Communications using the mmW radio frequency band have extremely high path loss and a short range. The mmW base station 180 may utilize beamforming 182 with the UE 104 to compensate for the path loss and short range. The base station 180 and the UE 104 may each include a plurality of antennas, such as antenna elements, antenna panels, or antenna arrays to facilitate the beamforming.

The base station 180 may transmit a beamformed signal to the UE 104 in one or more transmit directions 182a. The UE 104 may receive the beamformed signal from the base station 180 in one or more receive directions 182b. The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, or other IP services.

The base station may include or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a satellite phone, a cellular phone, a smart phone, a session initiation protocol (SIP) phone, a laptop, a personal digital assistant (PDA), a satellite radio, a global positioning system, a multimedia device, a video device, a digital audio player (for example, MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (for example, parking meter, gas pump, toaster, vehicles, heart monitor, among other examples). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the following description may be focused on 5G NR, the concepts described herein may be applicable to other similar areas, such as LTE, LTE-A, CDMA, GSM, and other wireless technologies.

Figures 2A, 2B, 2C, 2D:
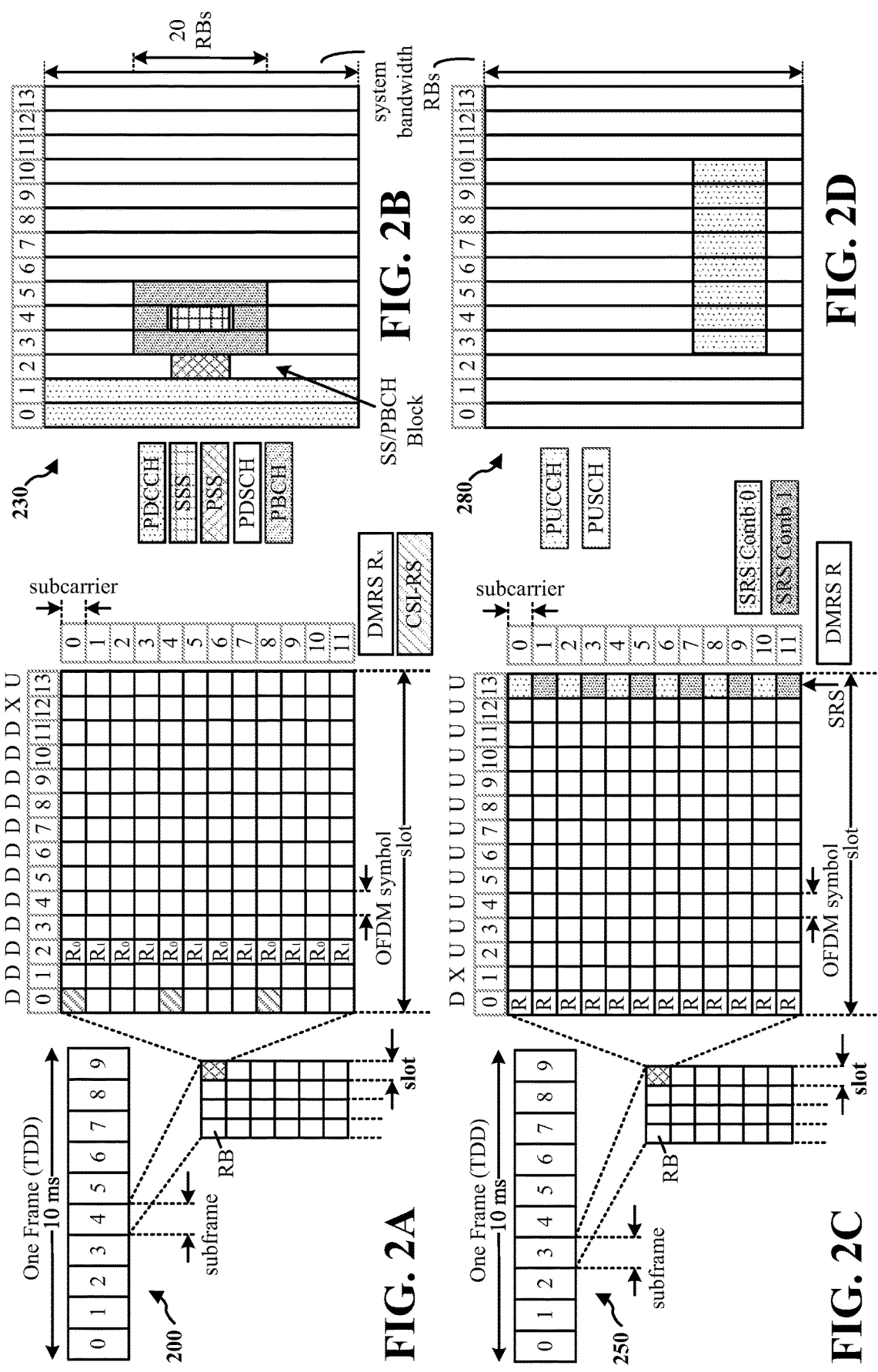
FIG. 2A is a diagram illustrating an example of a first 5G/NR frame, in accordance with some aspects of the present disclosure.
FIG. 2B is a diagram illustrating an example of DL channels within a 5G/NR subframe, in accordance with some aspects of the present disclosure.
FIG. 2C is a diagram illustrating an example of a second 5G/NR frame, in accordance with some aspects of the present disclosure.
FIG. 2D is a diagram illustrating an example of UL channels within a 5G/NR subframe, in accordance with some aspects of the present disclosure.

FIGS. 2A-2D include example diagrams 200, 230, 250, and 280 illustrating examples structures that may be used for wireless communication by the base station 102 and the UE 104, e.g., for 5G NR communication. FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description presented herein applies also to a 5G/NR frame structure that is TDD.

Other wireless communication technologies may have a different frame structure or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC- FDMA) symbols) (for power limited scenarios; limited to a single stream transmission). The number of slots within a subframe is based on the slot configuration and the numerology. For slot configuration 0, different numerologies μ 0 to 5 allow for 1, 2, 4, 8, 16, and 32 slots, respectively, per subframe. For slot configuration 1, different numerologies 0 to 2 allow for 2, 4, and 8 slots, respectively, per subframe. For slot configuration 0 and numerology μ, there are 14 symbols/slot and $2^\mu$ slots/subframe. The subcarrier spacing and symbol length/duration are a function of the numerology. The subcarrier spacing may be equal to $2^\mu*15$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 2A-2D provide an example of slot configuration 0 with 14 symbols per slot and numerology μ=0 with 1 slot per subframe. The subcarrier spacing is 15 kHz and symbol duration is approximately 66.7 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more CCE, each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (SSB). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), or UCI.

Figure 3:
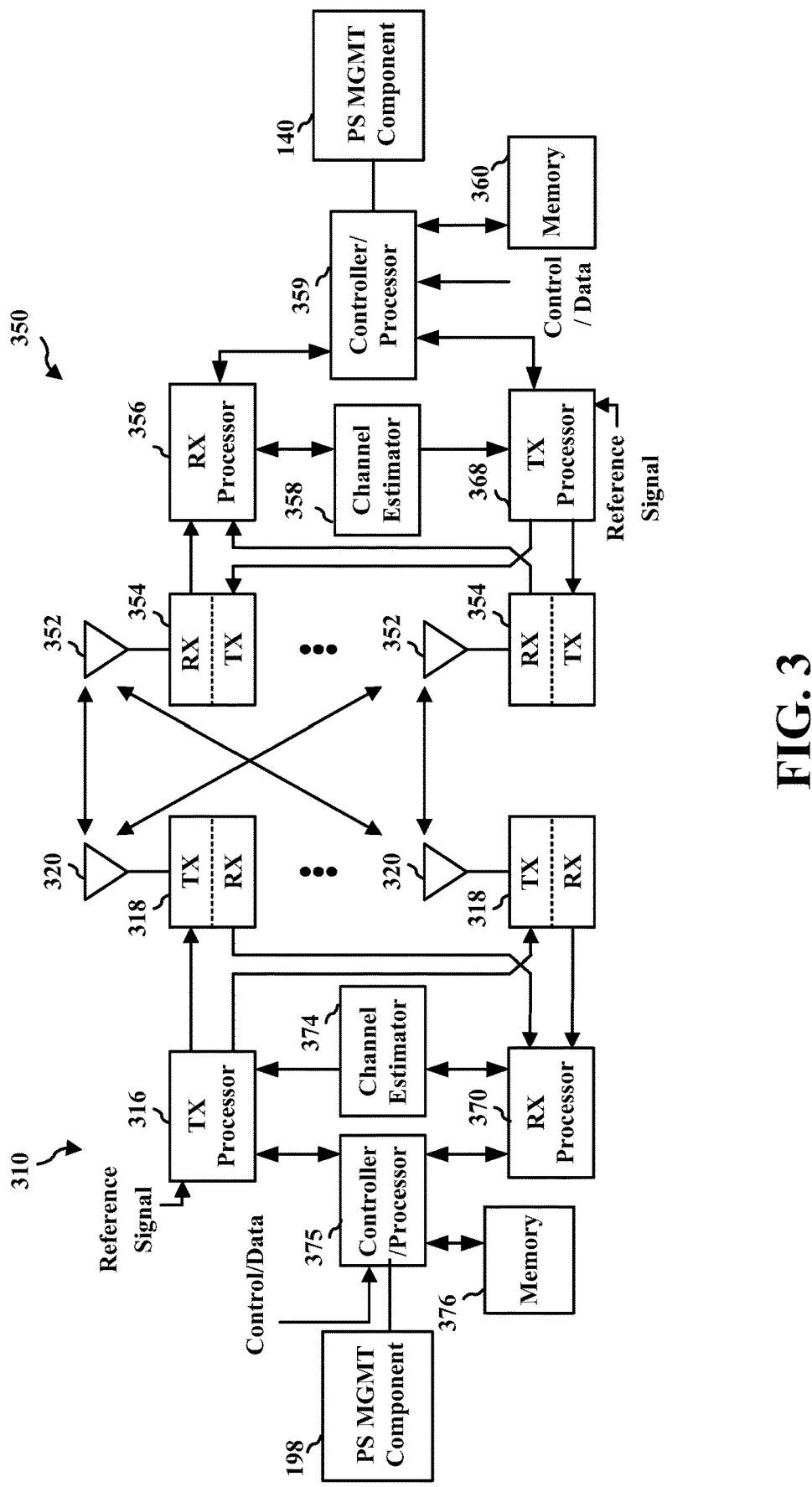
FIG. 3 is a diagram illustrating an example of a base station and a UE in an access network, in accordance with some aspects of the present disclosure.

FIG. 3 is a block diagram of a base station 102/180 in communication with a UE 104 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (such as MIB, SIBs), RRC connection control (such as RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (such as binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (such as a pilot) in the time or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal or channel condition feedback transmitted by the UE 104. Each spatial stream may then be provided to a different antenna 320 via a separate transmitter 318TX. Each transmitter 318TX may modulate an RF carrier with a respective spatial stream for transmission.

At the UE 104, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 104. If multiple spatial streams are destined for the UE 104, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 102/180. These soft decisions may be based on channel estimates computed by the channel estimator 358. The soft decisions are then decoded and deinterleaved to recover the data and control signals that were originally transmitted by the base station 102/180 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK or NACK protocol to support HARQ operations.

Similar to the functionality described in connection with the DL transmission by the base station 102/180, the controller/processor 359 provides RRC layer functionality associated with system information (for example, MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 102/180 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 102/180 in a manner similar to that described in connection with the receiver function at the UE 104. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 104. IP packets from the controller/processor 375 may be provided to the EPC 160. The controller/processor 375 is also responsible for error detection using an ACK or NACK protocol to support HARQ operations.

In the UE 104, at least one of the TX processor 368, the RX processor 356, and the controller/processor 359 may be configured to perform aspects in connection with the parameter set management component 140 of FIG. 1. In the base stations 102/180, at least one of the TX processor 316, the RX processor 370, and the controller/processor 375 may be configured to perform aspects in connection with the parameter set management component 198 of FIG. 1.

Deployment of communication systems, such as 5G new radio (NR) systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

Figure 4:
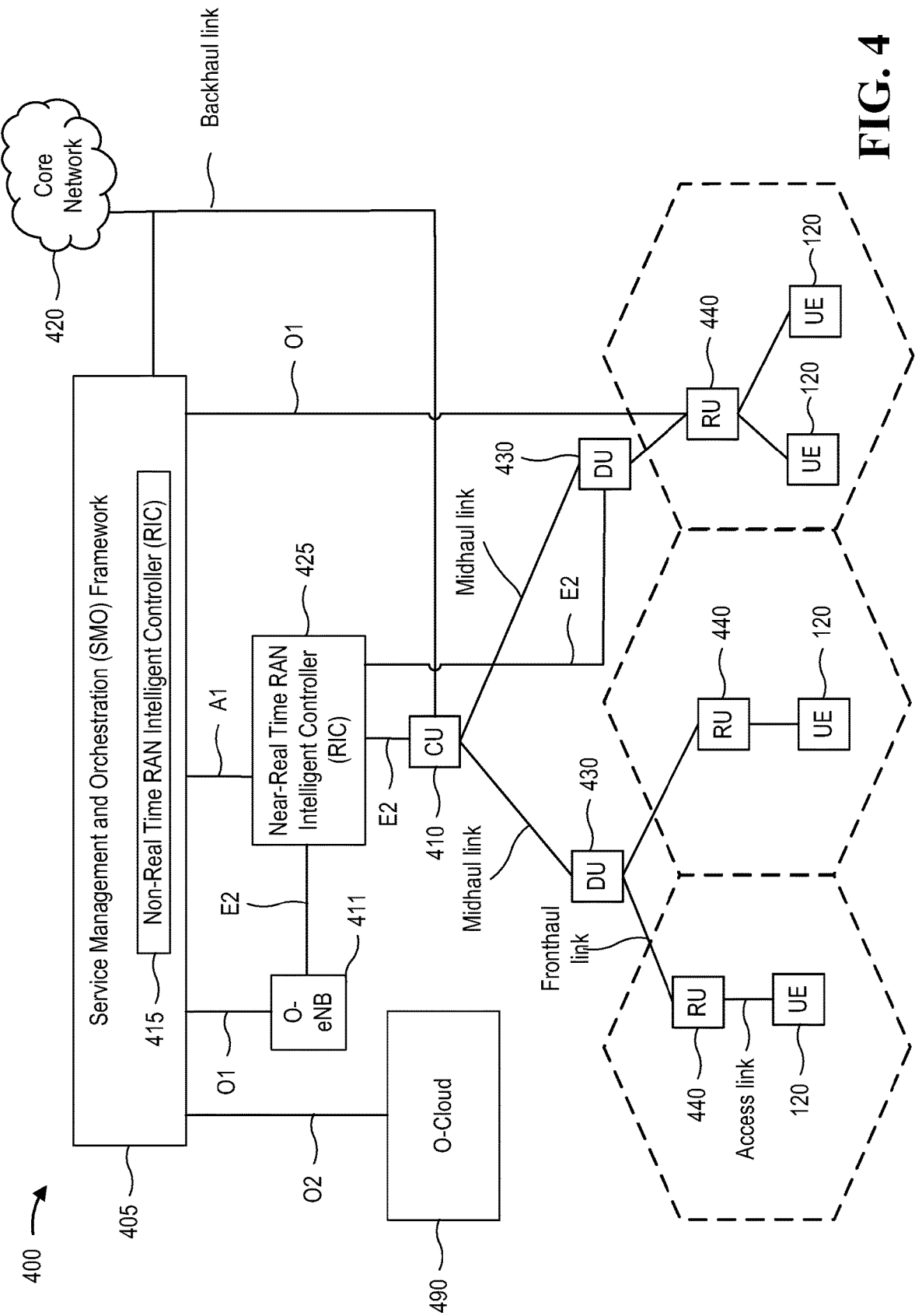
FIG. 4 is a diagram illustrating an example disaggregated base station architecture, in accordance with some aspects of the present disclosure.

FIG. 4 shows a diagram illustrating an example disaggregated base station 400 architecture. The disaggregated base station 400 architecture may include one or more central units (CUs) 410 that can communicate directly with a core network 420 via a backhaul link, or indirectly with the core network 420 through one or more disaggregated base station units (such as a Near-Real Time (Near-RT) RAN Intelligent Controller (RIC) 425 via an E2 link, or a Non-Real Time (Non-RT) RIC 415 associated with a Service Management and Orchestration (SMO) Framework 405, or both). A CU 410 may communicate with one or more distributed units (DUs) 430 via respective midhaul links, such as an F1 interface. The DUs 430 may communicate with one or more radio units (RUs) 440 via respective fronthaul links. The RUs 440 may communicate with respective UEs 104 via one or more radio frequency (RF) access links. In some implementations, the UE 104 may be simultaneously served by multiple RUs 440.

Each of the units, i.e., the CUs 410, the DUs 430, the RUs 440, as well as the Near-RT RICs 425, the Non-RT RICs 415 and the SMO Framework 405, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 410 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 410. The CU 410 may be configured to handle user plane functionality (i.e., Central Unit—User Plane (CU-UP)), control plane functionality (i.e., Central Unit—Control Plane (CU-CP)), or a combination thereof. In some implementations, the CU 410 can be logically split into one or more CU-UP units and one or more CU-CP units. The CU-UP unit can communicate bidirectionally with the CU-CP unit via an interface, such as the E1 interface when implemented in an O-RAN configuration. The CU 410 can be implemented to communicate with the DU 430, as necessary, for network control and signaling.

The DU 430 may correspond to a logical unit that includes one or more base station functions to control the operation of one or more RUs 440. In some aspects, the DU 430 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 430 may further host one or more low PHY layers. Each layer (or module) can be implemented with an interface configured to communicate signals with other layers (and modules) hosted by the DU 430, or with the control functions hosted by the CU 410.

Lower-layer functionality can be implemented by one or more RUs 440. In some deployments, an RU 440, controlled by a DU 430, may correspond to a logical node that hosts RF processing functions, or low-PHY layer functions (such as performing fast Fourier transform (FFT), inverse FFT (iFFT), digital beamforming, physical random-access channel (PRACH) extraction and filtering, or the like), or both, based at least in part on the functional split, such as a lower layer functional split. In such an architecture, the RU(s) 440 can be implemented to handle over the air (OTA) communication with one or more UEs 104. In some implementations, real-time and non-real-time aspects of control and user plane communication with the RU(s) 440 can be controlled by the corresponding DU 430. In some scenarios, this configuration can enable the DU(s) 430 and the CU 410 to be implemented in a cloud-based RAN architecture, such as a vRAN architecture.

The SMO Framework 405 may be configured to support RAN deployment and provisioning of non-virtualized and virtualized network elements. For non-virtualized network elements, the SMO Framework 405 may be configured to support the deployment of dedicated physical resources for RAN coverage requirements which may be managed via an operations and maintenance interface (such as an O1 interface). For virtualized network elements, the SMO Framework 405 may be configured to interact with a cloud computing platform (such as an open cloud (O-Cloud) 490) to perform network element life cycle management (such as to instantiate virtualized network elements) via a cloud computing platform interface (such as an O2 interface). Such virtualized network elements can include, but are not limited to, CUs 410, DUs 430, RUs 440 and Near-RT RICs 425. In some implementations, the SMO Framework 405 can communicate with a hardware aspect of a 4G RAN, such as an open eNB (O-eNB) 410, via an O1 interface. Additionally, in some implementations, the SMO Framework 405 can communicate directly with one or more RUs 440 via an O1 interface. The SMO Framework 405 also may include a non-RT RIC 415 configured to support functionality of the SMO Framework 405.

The Non-RT RIC 415 may be configured to include a logical function that enables non-real-time control and optimization of RAN elements and resources, Artificial Intelligence/Machine Learning (ML) workflows including model training and updates, or policy-based guidance of applications/features in the Near-RT RIC 425. The Non-RT RIC 415 may be coupled to or communicate with (such as via an A1 interface) the Near-RT RIC 425. The Near-RT RIC 425 may be configured to include a logical function that enables near-real-time control and optimization of RAN elements and resources via data collection and actions over an interface (such as via an E2 interface) connecting one or more CUs 410, one or more DUs 430, or both, as well as an O-eNB, with the Near-RT RIC 425.

In some implementations, to generate ML models to be deployed in the Near-RT RIC 425, the Non-RT RIC 415 may receive parameters or external enrichment information from external servers. Such information may be utilized by the Near-RT RIC 425 and may be received at the SMO Framework 405 or the Non-RT RIC 415 from non-network data sources or from network functions. In some examples, the non-RT RIC 415 or the Near-RT RIC 425 may be configured to tune RAN behavior or performance. For example, the non-RT RIC 415 may monitor long-term trends and patterns for performance and employ ML models to perform corrective actions through the SMO Framework 405 (such as reconfiguration via O1) or via creation of RAN management policies (such as A1 policies).

Referring to FIGS. 5-14, in one non-limiting aspect, a system 500 is configured to implement a procedure for implementing parameter set configuration and download, in accordance with some aspects of the present disclosure.

Figure 5:
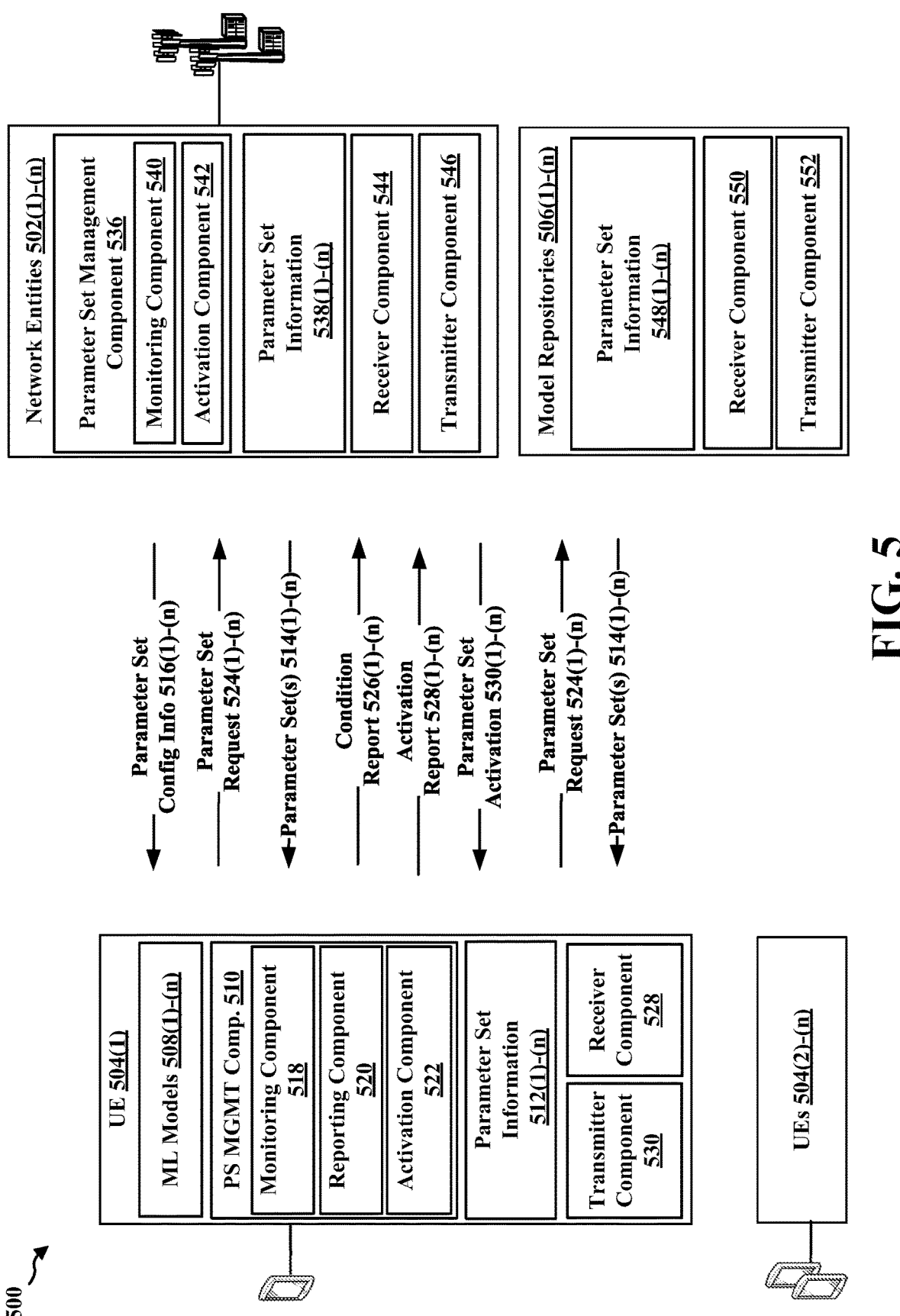
FIG. 5 is a diagram illustrating an example of communications of a network entities and devices, in accordance with some aspects of the present disclosure.

FIG. 5 is a diagram illustrating example communications and components of network entities and devices. As illustrated in FIG. 5, the system 500 may include one or more network entities 502(1)-(n) (e.g., the base station 102/180), one or more UEs 504(1)-(n) (e.g., the UEs 104), and one or more model repositories 506. Further, in some aspects, the network entities 502(1)-(n) may serve the UEs 504(1)-(n).

As illustrated in FIG. 5, a UE 504(1) may include one or more machine leaning models 508(1)-(n), a parameter set management component 510, and parameter set information 512. As described herein, in some aspects, a UE 504(1) may employ one or more machine learning (ML) models 508(1)-(n) to perform wireless communication with the network entities 502(1)-(n) and/or the other UEs 504(2)-(n). For example, the UE 504(1) may exchange wireless communications with the network entities 502(1)-(n) and other UEs 504(2)-(n) using the one or more ML models 508(1)-(n) to infer settings and/or configuration parameters for operations performed by the UE 504(1) to transmit and receive wireless data. The parameter set management component 510 may manage the parameter set information 512(1)-(n) used by the one or more ML models 508(1)-(n). Further, the parameter set information 512(1)-(n) may include parameter sets 514 (1)-(n) for the one or more ML models 508(1)-(n), an identifier for each of the parameter sets 514(1)-(n), and one or more activation conditions identifying when each of the parameter sets should be employed within the corresponding ML model 508 of the parameter set 514. In some aspects, the parameter set information 512 may include an identifier of a parameter set 514 and the corresponding activated condition but not the parameter set 514.

Additionally, in some aspects, the parameter set management component 510 may receive the parameter set information 512(1)-(n) from the network entities 502(1)-(n) and/or the model repositories 506(1)-(n). Further, the parameter set information 512 may be used to implementing configuration, update, switching, and download of the parameter sets 514(1)-(n). For example, the parameter set management component 510 may receive parameter set configuration information 516(1)-(n) and/or parameter sets 514(1)-(n) including the parameter set information 512(1)-(n) from the network entities 502(1)-(n), and/or receive the parameter sets 514(1)-(n) including the parameter set information 512(1)-(n) from the model repositories 506(1)-(n). In addition, the parameter set management component 510 may receive updates to the parameter set information 512 (1)-(n) from the network entities 502(1)-(n) and/or the model repositories 506(1)-(n). Further, the parameter set management component 510 may activate the parameter sets within the parameter set information 512(1)-(n) of the UE 504(1).

As illustrated in FIG. 5, the parameter set management component 510 (e.g., the parameter set management component 140) may include a monitoring component 518, a reporting component 520, and an activation component 522.

The monitoring component 518 may determine a condition of the UE 504(1) and/or the system 500. For example, the monitoring component 518 may determine whether the current condition of the UE 504(1) corresponds to an activation condition listed within the parameter set information 512(1)-(n). In some aspects, the monitoring component 518 may determine whether there has been a change to a monitored performance attribute of the UE 504(1) or a related network entity 502 (e.g., a performance downgrade of the UE 504(1) or network entity 502), a modification to a configuration of the UE 504(1) or a network serving the UE 504(1), a handover or mobility event associated with the UE 504(1), or a status change (e.g., activation, modification, or release) to a service (e.g., network slice, QoS flow, DNN or PDU Session) associated with the UE 504(1) or the network serving the UE 504(1).

The reporting component 516 may report a condition of the UE 504(1) to a network entity 502. For example, the reporting component 520 may transmit condition information to a network entity 502. In some aspects, the reporting component 520 may transmit parameter set requests 524(1)-(n) to the network entities 502(1)-(n) and the model repositories 506(1)-(n). A parameter set request 524 may identify a current condition of the UE 504(1) and/or a parameter set identifier of a parameter set associated with the current condition but not available at the UE 504(1). In some aspects, the reporting component 520 may transmit condition reports 526(1)-(n) to the network entities 502(1)-(n). A condition report 526 may identify one or more conditions detected by the monitoring component 518. Further, in some aspects, the reporting component 516 may report activation of a parameter set 514 at the UE 504(1). For example, the reporting component 516 may send activation reports 528 (1)-(n) to the network entities 502(1)-(n). An activation report 528 may identify a parameter set 514 activated at the UE 504(1). In some aspects, the activation report 528 may be transmitted using L1 (uplink control information—UCI)/L2 (MAC CE)/or radio resource control (RRC) signaling.

The activation component 522 may activate the parameter sets 514(1)-(n) at the UE 504(1). In some aspects, the activation component 522 may activate a parameter set 514 in response to the monitoring component 518 detecting a condition associated with the parameter set 514. In some other aspects, the activation component 522 may activate parameter sets 514 in response to parameter set activations 530(1)-(n) received from the network entities 502(1)-(n). For example, the UE 504(1) may activate a parameter set 514(1) in response to a parameter set activation 530(1) identifying the parameter set 514(1).

Additionally, the UE 504(1) may include a receiver component 532, and a transmitter component 534. The receiver component 532 may include, for example, a RF receiver for receiving the signals described herein. The transmitter component 534 may be configured to generate signals for transmission operations as described herein. The transmitter component 534 may include, for example, a RF transmitter for transmitting the signals described herein. In an aspect, the receiver component 520 and the transmitter component 534 may be co-located in a transceiver (e.g., the transceiver 1310 shown in FIG. 13).

As illustrated in FIG. 5, a network entity 502 may include a parameter set management component 536 (e.g., a parameter set management component 198) and parameter set information 538. The parameter set management component 536 may manage the parameter set information 512(1)-(n) used by the one or more ML models 508(1)-(n) of the UEs 504(1)-(n). For example, the parameter set management component 510 may transmit the parameter set configuration information 516(1) to the UEs 504(1) and activate a parameter set 514 identified or included within the parameter set configuration information 516.

The parameter set management component 536 (e.g., the parameter set management component 198) may include a monitoring component 540 and an activation component 542. In some aspects, the monitoring component 540 may determine the condition of the UEs 504 and the system 500. For example, the monitoring component 540 may determine whether the current condition of the UE 504(1) corresponds to an activation condition having an associated parameter set 514, e.g., a parameter set 514 associated with a condition within the parameter set configuration information 516(1)-(n). In some aspects, the monitoring component 540 may determine whether there has been a change to a monitored performance attribute of a UE 504 or the network entity 502(1), a modification to a configuration of a UE 504 or the system 500, a handover or mobility event associated with a UE 504, or a status change (e.g., activation, modification, or release) to a service (e.g., network slice, QoS flow, DNN or PDU Session) associated with a UE 504 or the system 500. The activation component 542 may activate the parameter sets 514(1)-(n) at the UEs 504(1)-(n). In some aspects, the activation component 542 may activate a parameter set 514 at a UE in response to determining a current condition of a UE 504 is associated with the parameter set 514. For example, in some aspects, the activation component 542 may transmit a parameter set activation 530 to activate a parameter set 514 at a UE 504 in response to the monitoring component 540 determining the condition of the UE 504 corresponds to the parameter set 514. In some other aspects, the activation component 542 may transmit a parameter set activation 530 to activate a parameter set 514 at a UE 504 in response to the receiving a parameter set request 524 or a condition report 526 identifying a current condition of the UE 504 associated with the parameter set 514. In some aspects, the parameter set activation 530 may be transmitted using L1 (downlink control information—DCI)/L2 (MAC CE) signaling.

In addition, the network entity 502 may include a receiver component 544 and a transmitter component 546. The receiver component 544 may include, for example, a radio frequency (RF) receiver for receiving the signals described herein. The transmitter component 546 may include, for example, an RF transmitter for transmitting the signals described herein. In an aspect, the receiver component 544 and the transmitter component 546 may be co-located in a transceiver (e.g., the transceiver 1110 shown in FIG. 11).

As illustrated in FIG. 5, the model repositories 506(1)-(n) may include the parameter set information 548(1)-(n). In addition, the model repositories 506(1)-(n) may include a receiver component 550 and a transmitter component 552. The receiver component 550 may include, for example, a radio frequency (RF) receiver for receiving the signals described herein. The transmitter component 552 may include, for example, an RF transmitter for transmitting the signals described herein. In an aspect, the receiver component 550 and the transmitter component 552 may be co-located in a transceiver.

Figure 6:
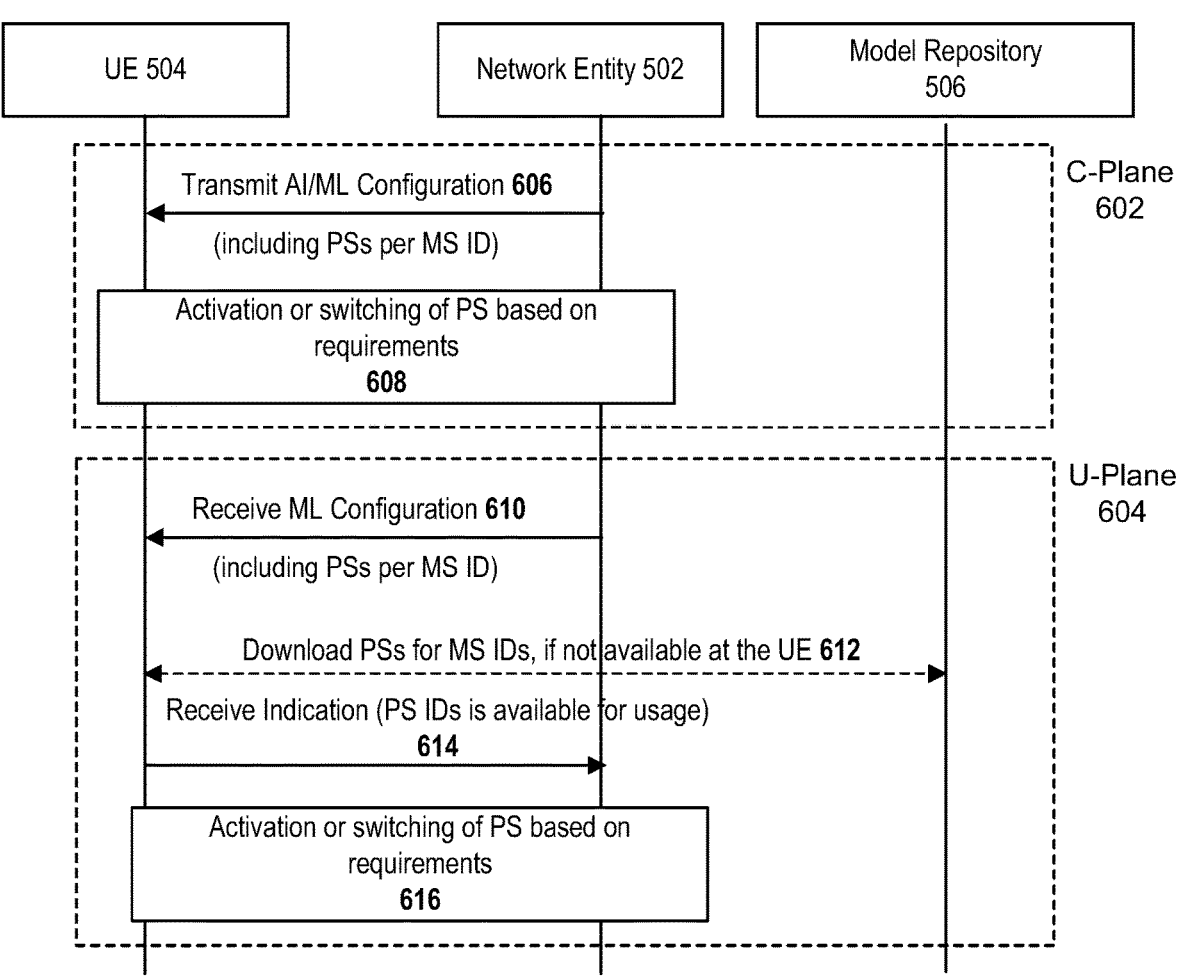
FIG. 6 is a diagram illustrating an example method of configuring parameter set information at a UE, in accordance with some aspects of the present disclosure.

FIG. 6 is a diagram illustrating an example method of configuring parameter set information at a UE, in accordance with some aspects of the present disclosure. In some aspects, a network entity 502 and UE 504 may employ a control plane (c-plane) process 602 or a user plane (u-plane) process 604 for parameter set configuration and update. For instance, in the c-plane process 602, at step 606, a network entity 502 may transmit ML configuration information (e.g., the parameter set configuration information 516) to a UE 504. At step 608, the UE 504 may activate a parameter set (e.g., a parameter set 514 included in the parameter set information 512).

In some other instances, in the u-plane process 604, at step 610, a network entity 502 may transmit ML configuration information (e.g., the parameter set configuration information 516) to the UE 504. Further, the ML configuration information may include parameter set identifiers and activation conditions for activating each parameter set corresponding to one of the parameter set identifiers. At step 612, the UE 504 may download one or more parameter sets (e.g., the parameter sets 514) from the model repository 506 if the one or more parameter sets are not available at the UE 504. At step 614, the UE may transmit an indication to the network entity 502 identifying the parameter sets (e.g., the parameter set information 512) that are available at the UE 504. At step 608, the UE 504 may activate a parameter set (e.g., a parameter set 514 included in the parameter set information 512).

FIG. 7 is a diagram illustrating an example of re-configuring parameter set information at a UE, in accordance with some aspects of the present disclosure. At step 702, a network entity 502 may transmit ML configuration information (e.g., the parameter set configuration information 516(1)) to a UE 504. Further, the ML configuration information may include parameter set identifiers and activation conditions for activating each parameter set corresponding to one of the parameter set identifiers. At step 704, the UE 504 may retrieve parameter sets (e.g., the parameter sets 514) from the model repository 506 if they are not available at the UE 504. At step 706, the UE 504 may receive an ML activation (e.g., the parameter set activation 530(1)) from the network entity 502. At step 708, the UE 504 may activate a parameter set (e.g., a parameter set 514 included in the parameter set information 512 or downloaded from the model repository 506) in response to the ML activation. At step 710, the UE 504 may receive updated ML configuration information (e.g., the parameter set configuration information 516(2)) from the network entity 502. At step 712, the UE 504 may retrieve parameter sets or delta information from the model repository 506 if they are not available at the UE 504. In some aspects, the parameter set configuration information 516 and/or the parameter set 514 may provide one or more the parameter sets 514 as delta information. As used herein, in some aspects, "delta information" ($\delta$) may refer to the difference between a reference parameter set and a parameter set. Further, in some aspects, a UE 504 may receive generate a parameter set by combining a reference parameter set and delta information corresponding to the parameter set in order to reduce storage and bandwidth usage. At step 706, the UE may receive an ML activation (e.g., the parameter set activation 530(2)) from the network entity 502.

FIG. 8 is a diagram illustrating an example of obtaining additional parameter set information at a UE, in accordance with some aspects of the present disclosure. In some aspects, every parameter set may not be currently available at a UE 504. For example, the UE 504 may receive parameter set configuration information including parameter set identifiers and corresponding activation conditions for one or more parameter sets. As another example, the UE 504 may only receive a subset of the parameter sets used within the system 500.

Accordingly, at step 802 of a c-plane process 804, the UE 504 may transmit UE assistance information (e.g., the condition report 526(1)) to the network entity 502. In some aspects, the UE assistance information may include a condition detected by the UE 504 and/or one or more parameter set identifiers. The parameter set identifiers may identify the parameter sets available at the UE. Additionally, or alternatively, the parameter set identifiers may identify the parameter sets that are not available at the UE 504 but needed in view of a condition detected at the UE 504. At step 806, the UE 504 may receive a parameter set corresponding to the condition identified within UE assistance information, or a parameter set identifier of a reference parameter and delta information that may be used to generate a parameter set corresponding to the condition identified within UE assistance information.

Accordingly, at step 802 of a c-plane process 804, the UE 504 may transmit UE assistance information (e.g., the condition report 526(1)) to the network entity 502. In some aspects, the UE assistance information may include a condition detected by the UE 504 and/or one or more parameter set identifiers. The parameter set identifiers may identify the parameter sets available at the UE. Additionally, or alternatively, the parameter set identifiers may identify the parameter sets that are not available at the UE 504 but needed in view of a condition detected at the UE 504. At step 806, the UE 504 may receive a parameter set corresponding to the condition identified within UE assistance information, or a parameter set identifier of a reference parameter and delta information that may be used to generate a parameter set corresponding to the condition identified within UE assistance information.

In some aspects, the UE 504 may be aware of the parameter set identifier needed for a detected condition associated with the UE 504. For example, the UE 504 may be able to determine the parameter set identifier from parameter set configuration information 516 received from a network entity 502. Accordingly, at step 808 of a first c-plane process 810 between the UE 504 and a model repository 506, the UE 504 may retrieve the parameter set associated with the detected condition using the parameter set identifier (e.g., via a parameter set request 524) or a reference primary set and delta information for generating the parameter set associated with the detected condition using the parameter set identifier (e.g., via a parameter set request 524), when the parameter set is not available at the UE 504.

In some other aspects, the UE 504 may not be aware of the parameter set identifier needed for a detected condition associated with the UE 504. Accordingly, at step 808 of a second c-plane process 810, the UE 504 may transmit UE assistance information (e.g., the condition report 526(2)) to the network entity 502. In some aspects, the UE assistance information may include a condition detected by the UE 504 and/or one or more parameter set identifiers. The parameter set identifiers may identify the parameter sets available at the UE. As step 812, the UE 504 may receive ML configuration (e.g., parameter set configuration information 516, parameter set 514) from the network entity 502. At step 814, the UE 504 may retrieve the parameter set associated with the detected condition using the parameter set identifier (e.g., via a parameter set request 524) or a reference primary set and delta information for generating the parameter set associated with the detected condition using the parameter set identifier (e.g., via a parameter set request 524)), when the parameter set is not available at the UE 504.

Figure 9:
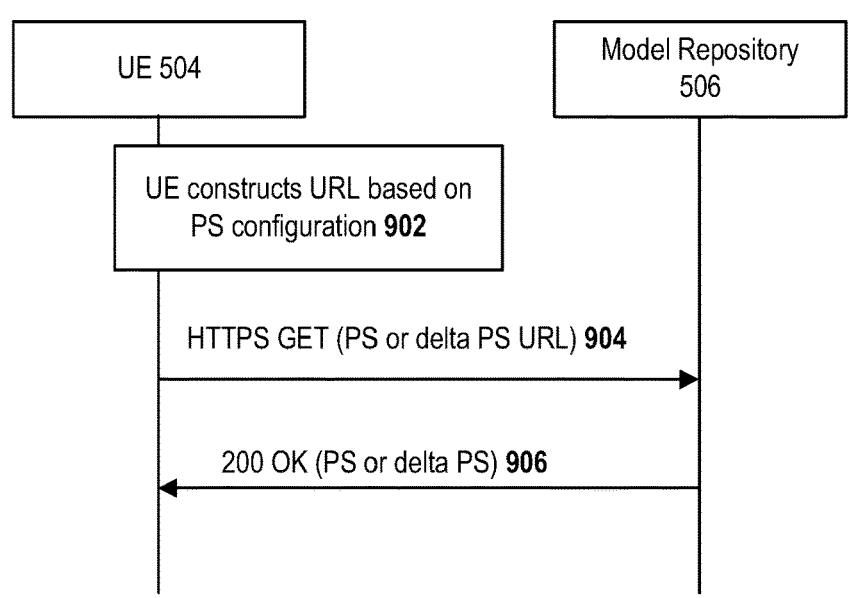
FIG. 9 is a diagram illustrating an example of downloading parameter set information from a model repository, in accordance with some aspects of the present disclosure.

FIG. 9 is a diagram illustrating an example of downloading parameter set information from a model repository, in accordance with some aspects of the present disclosure. At step 902, the UE 504 may construct a universal resource locator (URL) based on the parameter set configuration information 516 received from the network entity 502. At step 904, the UE 504 may transmit a request (e.g., a hypertext transfer protocol secure (HTTPS) GET) to the URL for a parameter set or delta information corresponding to the parameter set to the model repository 506. At step 906, the UE 504 may receive the parameter set or delta information from the model repository.

FIG. 10 is a diagram illustrating an example storage structure for storing parameter set information at a model repository, in accordance with some aspects of the present disclosure. As illustrated in FIG. 10, the parameter set identifier 1004 identifying the parameter set 1002 may be at the root level of the storage structure 1000. At the second level, the storage structure 1000 may include the parameter set 1002. Further, the second level may include a plurality of reference parameter set identifiers 1004(1)-(*n*). At the third level, each of the plurality of reference parameter set identifiers may have corresponding delta information 1006(*n*). For example, the reference parameter set identifier 1004(1) at the second level may map to the delta information 1006(1) between the parameter set 1002 and the reference parameter set identified by the reference parameter set identifier 1004 (1), the reference parameter set identifier 1004(*n*) at the second level may map to the delta information 1006(*n*) between the parameter set 1002 and the reference parameter set identified by the reference parameter set identifier 1004 (*n*), and so forth. Further, in some aspects, a UE 504 may utilize the storage structure to generate URL for accessing a parameter set or delta information. For example, the UE 504 may generate a URL including the levels of the storage structure of a parameter set to access the parameter set or delta information that may be used to generate the parameter set (e.g., www.modelrepository.com/required PS_ID to access the parameter set or www.modelrepository.com/required_PS_ID/reference_PS_ID to access the delta information for a parameter set and reference parameter set). Further, a network entity 502 may utilize the storage structure when determining which primary reference and delta information to use. For example, the network entity may determine the reference parameter set closest to a required parameter set based on a detected condition using the storage structure of the parameter sets.

Figure 11:
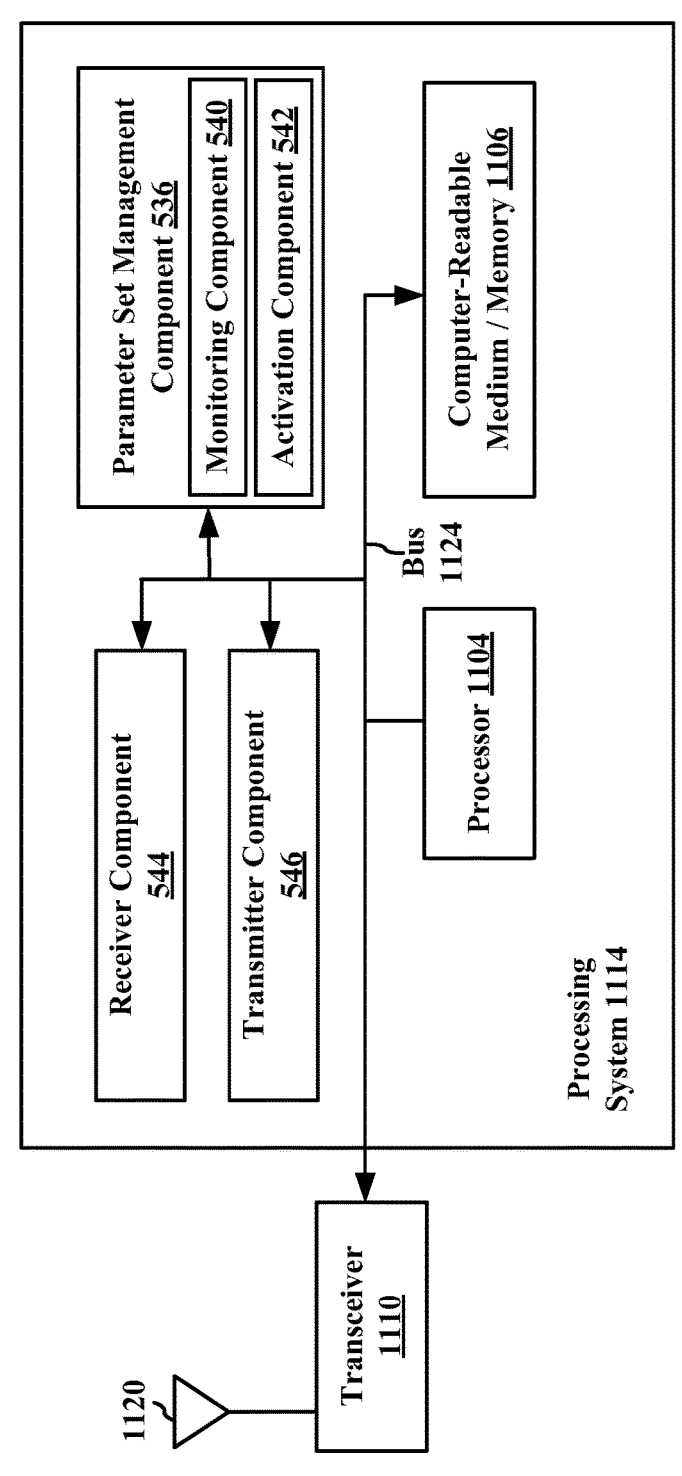
FIG. 11 is a diagram illustrating an example of a hardware implementation for a network entity employing a processing system, in accordance with some aspects of the present disclosure.

FIG. 11 is a diagram 1100 illustrating an example of a hardware implementation for a network entity 1102 employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware components, represented by the processor 1104, the parameter set management component 198/540, and the computer-readable medium/memory 1106. The bus 1124 may also link various other circuits such as timing sources, peripherals, voltage regulators, and power management circuits, which are well known in the art, and therefore, will not be described any further.

The processing system 1114 may be coupled with a transceiver 1110. The transceiver 1010 is coupled with one or more antennas 1120. The transceiver 1110 provides a means for communicating with various other apparatus over a transmission medium. The transceiver 1110 receives a signal from the one or more antennas 1120, extracts information from the received signal, and provides the extracted information to the processing system 1114, specifically the receiver component 544. The receiver component 544 may receive the parameter set requests 524, the condition reports 526, and the activation reports 528. In addition, the transceiver 1110 receives information from the processing system 1114, specifically the transmitter component 546, and based on the received information, generates a signal to be applied to the one or more antennas 1120. Further, the transmitter component 546 may send the parameter set configuration information 516, the parameter sets 514, and the parameter set activations 530.

The processing system 1114 includes a processor 1104 coupled with a computer-readable medium/memory 1106 (e.g., a non-transitory computer readable medium). The processor 1104 is responsible for general processing, including the execution of software stored on the computer-readable medium/memory 1106. The software, when executed by the processor 1104, causes the processing system 1114 to perform the various functions described supra for any particular apparatus. The computer-readable medium/memory 1106 may also be used for storing data that is manipulated by the processor 1104 when executing software. The processing system 1114 further includes the parameter set management component 198/540. The aforementioned components may be software components running in the processor 1104, resident/stored in the computer readable medium/memory 1106, one or more hardware components coupled with the processor 1104, or some combination thereof. The processing system 1114 may be a component of the base station 310 and may include the memory 376 and/or at least one of the TX processor 316, the RX processor 370, and the controller/processor 375. Alternatively, the processing system 1114 may be the entire base station (e.g., see 310 of FIG. 3, network entity 502 of FIG. 5).

The aforementioned means may be one or more of the aforementioned components of the network entity 1102 and/or the processing system 1114 of the network entity 1102 configured to perform the functions recited by the aforementioned means. As described supra, the processing system 1114 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Referring to FIG. 11 and FIG. 12, in operation, network entity 1100 may perform a method 1200 of wireless communication, by such as via execution of the parameter set management component 198/540 by the processor 1104, the computer-readable medium/memory 1106, the TX Processor 316, the RX Processor 370, and the controller/processor 375.

At block 1202, the method 1200 includes transmitting, by the network, parameter set configuration information to a user equipment (UE), the parameter set configuration information corresponding to a model structure employed in a machine learning operation by the UE for wireless communication. For example, in an aspect, the network entity 1100, the processor 1104, the computer-readable medium/memory 1106, the parameter set management component 198/540, and/or receiver component 544 may be configured to or may comprise means for receiving parameter set configuration information from a network entity, the parameter set configuration information corresponding to a model structure employed in a machine learning operation by the UE for the wireless communication. For example, the network entity 1102 may transmit the parameter set configuration information 516 to the UE 504.

At block 1204, the method 1200 includes causing activation of a parameter set in response to an activation condition, the parameter set identified within the parameter set configuration information as being associated with the activation condition. For example, in an aspect, the network entity 1100, processor 1104, computer-readable medium/memory 1106, the parameter set management component 198/540, and/or activating component 1125 may be configured to or may comprise means for activating a parameter set in response to an activation condition, the parameter set identified within the parameter set configuration information as being associated with the activation condition. For example, the network entity 1102 may transmit a parameter set 514 and/or a parameter set activation 530 to the UE 504. Further, the UE 504 may activate a parameter set of the parameter set information 512 within a ML model 508 based upon in response to receipt of the parameter set 514 and/or the parameter set activation 530. As described herein, the network entity 1302 may transmit the parameter set 514 and/or the parameter set activation 530 in response to an activation condition detected by the UE 504 or the network entity 1302. Accordingly, the network entity 1102 may cause the UE 504 to employ a parameter set best suited for a ML model used for wireless communication by the UE 1302 based upon a condition detected by the UE 504 or the network serving the UE 504.

Figure 13:
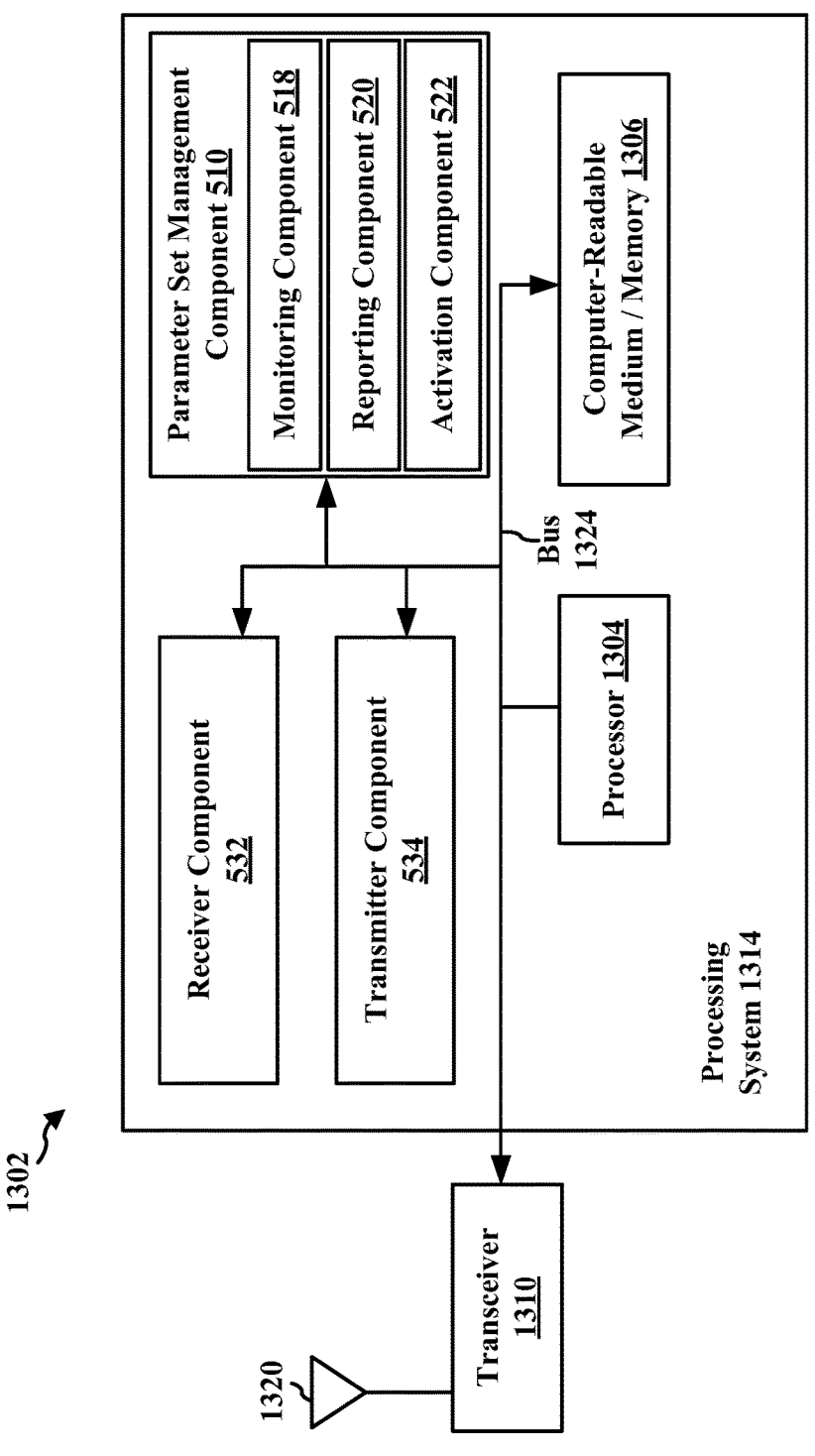
FIG. 13 is a diagram illustrating an example of a hardware implementation for a user equipment employing a processing system, in accordance with some aspects of the present disclosure.

FIG. 13 is a diagram 1300 illustrating an example of a hardware implementation for a UE 1302 (e.g., the UE 104, the UE 504, etc.) employing a processing system 1314. The processing system 1314 may be implemented with a bus architecture, represented generally by the bus 1324. The bus 1324 may include any number of interconnecting buses and/or bridges depending on the specific application of the processing system 1314 and the overall design constraints. The bus 1324 links together various circuits including one or more processors and/or hardware components, represented by the processor 1304, the parameter set management component 140/510, and the computer-readable medium (e.g., non-transitory computer-readable medium)/memory 1306. The bus 1324 may also link various other circuits such as timing sources, peripherals, voltage regulators, and power management circuits, which are well known in the art, and therefore, will not be described any further.

The processing system 1314 may be coupled with a transceiver 1310. The transceiver 1310 may be coupled with one or more antennas 1320. The transceiver 1310 provides a means for communicating with various other apparatus over a transmission medium. The transceiver 1310 receives a signal from the one or more antennas, extracts information from the received signal, and provides the extracted information to the processing system 1314, specifically the receiver component 532. The receiver component 532 may receive the parameter set configuration information 516, the parameter sets 514, and the parameter set activations 530. In addition, the transceiver 1310 receives information from the processing system 1314, specifically the transmitter component 534, and based on the received information, generates a signal to be applied to the one or more antennas. Further, the transmitter component 534 may send the parameter set requests 524, the condition reports 526, and the activation reports 528.

The processing system 1314 includes a processor 1304 coupled with a computer-readable medium/memory 1306 (e.g., a non-transitory computer readable medium). The processor 1304 is responsible for general processing, including the execution of software stored on the computer-readable medium/memory 1306. The software, when executed by the processor 1304, causes the processing system 1314 to perform the various functions described supra for any particular apparatus. The computer-readable medium/memory 1306 may also be used for storing data that is manipulated by the processor 1304 when executing software. The processing system 1314 further includes the parameter set management component 140/510. The aforementioned components may be a software component running in the processor 1304, resident/stored in the computer readable medium/memory 1306, one or more hardware components coupled with the processor 1304, or some combination thereof. The processing system 1314 may be a component of the UE 1302 and may include the memory 360 and/or at least one of the TX processor 368, the RX processor 356, and the controller/processor 359. Alternatively, the processing system 1314 may be the entire UE (e.g., see 350 of FIG. 3, UE 504 of FIG. 5).

The aforementioned means may be one or more of the aforementioned components of the UE 1302 and/or the processing system 1314 of UE 1302 configured to perform the functions recited by the aforementioned means. As described supra, the processing system 1314 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Referring to FIG. 13 and FIG. 14, in operation, UE 1302 may perform a method 1400 of wireless communication, by such as via execution of the parameter set management component 140/510 by the processor 1304, the computer-readable medium/memory 1306, TX processor 368, the RX processor 356, and/or the controller/processor 359.

At block 1402, the method 1400 includes receiving parameter set configuration information from a network entity, the parameter set configuration information corresponding to a model structure employed in a machine learning operation by the UE for the wireless communication. For example, in an aspect, UE 504, the processor 1304, the computer-readable medium/memory 1306, the parameter set management component 140/510, the monitoring component 518, and/or receiver component 534 may be configured to or may comprise means for transmitting, by the network, parameter set configuration information to a user equipment (UE), the parameter set configuration information corresponding to a model structure employed in a machine learning operation by the UE for wireless communication. For example, the UE 1302 may receive the parameter set configuration information 516 from the network entity 502. In some aspects, as described in detail herein, the parameter set configuration information 516 may include parameter set identifiers and/or delta information instead of the full parameter set to minimize storage usage and/or bandwidth usage.

At block 1404, the method 1400 includes activating a parameter set in response to an activation condition, the parameter set identified within the parameter set configuration information as being associated with the activation condition. For example, in an aspect, the UE 1302, the UE 504, the parameter set management component 140/510, the processor 1304, the computer-readable medium/memory 1306, the parameter set management component 140/510, the monitoring component 518, the reporting component

520, the activation component 522, the receiver component 532 and/or transmitter component 534 may be configured to or may comprise means for causing activation of a parameter set in response to an activation condition, the parameter set identified within the parameter set configuration information as being associated with the activation condition. For example, the UE 1302 may activate a parameter set of the parameter set information 512 within a ML model 508 based upon an activation condition detected by the network entity 502 or the UE 1302. Accordingly, the UE 1302 may employ a parameter set best suited for a ML model used for wireless communication by the UE 1302 based upon a condition detected by the UE 1302 or the network serving the UE 1302.

The previous description is provided to enable any person having ordinary skill in the art to practice the various aspects described herein. Various modifications to these aspects will be readily apparent to a person having ordinary skill in the art, and the generic principles defined herein may be applied to other aspects. The claims are not intended to be limited to the aspects shown herein, but is to be accorded the full scope consistent with the language claims, where reference to an element in the singular is not intended to mean "one and only one" unless specifically so stated, but rather "one or more." Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to a person having ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

EXAMPLE CLAUSES

The following example clauses describe various aspects of the present disclosure.

A. A method for wireless communication by a UE comprising: receiving parameter set configuration information from a network entity, the parameter set configuration information corresponding to a model structure employed in a machine learning operation by the UE for wireless communication; and activating a parameter set in response to an activation condition, the parameter set identified within the parameter set configuration information as being associated with the activation condition.

B. The method of clause A, wherein the parameter set configuration information includes the parameter set.

C. The method of clause A, wherein the parameter set configuration information includes a parameter set identifier identifying the parameter set, and further comprising transmitting, to a repository, a request for the parameter set, the request including the parameter set identifier; and receiving, from the repository, the parameter set in response to the request.

D. The method of clause C, further comprising determining that the parameter set is not currently stored at the UE; and wherein transmitting the request comprises transmitting the request in response to the parameter set not currently being stored at the UE.

E. The method of any of clauses A-D, further comprising detecting the activation condition; identifying the parameter set associated with the activation condition; and wherein activating the parameter set comprises transmitting a notification to the network entity that the parameter set has been activated.

F. The method of any of clauses A-D, further comprising detecting the activation condition; identifying the parameter set associated with the activation condition; transmitting, to the network entity, a request to activate the parameter set; and wherein activating the parameter set comprises receiving an indication to activate the parameter set in response to the request.

G. The method of any of clauses A-F, further comprising receiving an indication to activate the parameter set in response to the network entity detecting the activation condition; and wherein activating the parameter set comprises activating the parameter set in response to receipt of the indication.

H. The method of any of clauses A-G, wherein the parameter set is an activated parameter set, the parameter set configuration information includes a reference parameter set and delta information, and further comprising determining the activated parameter set based on the reference parameter set and the delta information.

I. The method of any of clauses A-G, wherein the parameter set is an activated parameter set, the parameter set configuration information includes a reference parameter set identifier and delta information, and further comprising identifying a reference parameter set corresponding to the reference parameter set identifier; and determining the activated parameter set based on the reference parameter set and the delta information.

J. The method of any of clauses A-G, wherein the parameter set is an activated parameter set, the parameter set configuration information includes a reference parameter set identifier and an activated parameter set identifier, and further comprising transmitting a request for delta information to a repository, the request including the reference parameter set identifier and the activated parameter set identifier; receiving, from a repository, the delta information in response to the request; and determining the activated parameter set based on the reference parameter set and the delta information.

K. The method of any of clauses A-J, wherein the parameter set configuration information is updated parameter set configuration information, the parameter set is an updated parameter set, the activation condition is a currently-activation condition; and further comprising activating the updated parameter set in response to the currently-activation condition comprises being configured to switch from an older parameter set associated with a previous parameter set configuration information to the parameter set associated with the updated parameter set configuration information, the older parameter set associated with a previously-activation condition L. The method of any of clauses A-K, further comprising transmitting, to the network entity, parameter request information including the activation condition and one or more reference candidates; and wherein activating the parameter set comprises receiving the parameter set configuration information based on the parameter request information.

M. The method of any of clauses A-D, wherein the activation condition includes at least one of: a change to a monitored performance attribute; a modification to a configuration of the UE or a network serving the UE; a handover or mobility event associated with the UE; or a status change to a service associated with the UE or the network serving the UE.

N. One or more non-transitory computer-readable media encoded with instructions that, when executed by one or more processors, configure a computing device to perform a computer-implemented method as any of clauses A-M recite.

O. A device comprising one or more processors and one or more computer-readable media encoded with instructions that, when executed by the one or more processors, configure a computer to perform a computer-implemented method as any of clauses A-M recite.

P. A device, comprising means for performing the method of any of clauses A-M.

Q. A method for wireless communication by a network entity comprising: transmitting parameter set configuration information to a user equipment (UE), the parameter set configuration information corresponding to a model structure employed in a machine learning operation by the UE for wireless communication; and causing activation of a parameter set in response to an activation condition, the parameter set identified within the parameter set configuration information as being associated with the activation condition.

R. The method of clause Q, wherein the parameter set configuration information includes the parameter set.

S. The method of clause Q, wherein the parameter set configuration information includes a parameter set identifier identifying the parameter set.

T. The method of clause Q, wherein the parameter set configuration information includes a reference parameter set and delta information that are configured for use by the UE to generate the parameter set.

U. The method of any of clauses Q-T, further comprising detecting the activation condition; identifying the parameter set associated with the activation condition; and wherein causing activation of the parameter set in response to the activation condition comprises transmitting a parameter set identifier to the UE, the parameter set identifier identifying the parameter V. The method of any of clauses Q-U, further comprising receiving, from the UE, parameter request information including the activation condition and one or more reference candidates; and wherein causing activation of the parameter set comprises transmitting the parameter set configuration information based on the parameter request information.

W. The method of any of clauses Q-V, wherein the activation condition includes at least one of: a change to a monitored performance attribute; a modification to a configuration of the UE or a network serving the UE; a handover or mobility event associated with the UE; or a status change to a service associated with the UE or the network serving the UE.

X. One or more non-transitory computer-readable media encoded with instructions that, when executed by one or more processors, configure a computing device to perform a computer-implemented method as any of clauses Q-W recite.

Y. A device comprising one or more processors and one or more computer-readable media encoded with instructions that, when executed by the one or more processors, configure a computer to perform a computer-implemented method as any of clauses Q-W recite.

Z. A device, comprising means for performing the method of any of clauses Q-W.

What is claimed is:

1. A user equipment (UE) apparatus, comprising:
one or more memories; and
one or more processors coupled with the one or more memories and configured to:
    receive, from a network entity, a parameter set configuration indicating one or more parameter sets corresponding to a model structure employed in a machine learning operation by the UE apparatus for wireless communication, wherein the parameter set configuration does not include the one or more parameter sets;
    transmit, to the network entity and based on at least one of the one or more parameter sets indicated in the parameter set configuration not being stored at the UE apparatus, a request to receive the at least one of the one or more parameter sets from a model repository;
    receive, from the network entity and based on the request, the at least one of the one or more parameter sets from the model repository; and
    activate, based on an activation condition and for the machine learning operation, a parameter set of the one or more parameter sets.

2. The UE apparatus of claim 1, wherein the one or more processors are further configured to:
detect the activation condition;
identify the parameter set associated with the activation condition; and
transmit, to the network entity and based on activating the parameter set, a notification that the parameter set has been activated.

3. The UE apparatus of claim 1, wherein the one or more processors are further configured to:
detect the activation condition;
identify the parameter set associated with the activation condition;
transmit, to the network entity, an activation request to activate the parameter set; and
receive, from the network entity and based on the activation request, an indication to activate the parameter set.

4. The UE apparatus of claim 1, wherein the one or more processors are further configured to:
receive an indication to activate the parameter set based on the network entity detecting the activation condition; and
wherein the one or more processors are configured to activate the parameter set based on receiving the indication.

5. The UE apparatus of claim 1, wherein the parameter set is an activated parameter set, the parameter set configuration includes a reference parameter set and delta information, and wherein the one or more processors are further configured to:

determine the activated parameter set based on the reference parameter set and a difference from the reference parameter set indicated by the delta information.

6. The UE apparatus of claim 1, wherein the parameter set is an activated parameter set, the parameter set configuration includes a reference parameter set identifier and delta information, and wherein the one or more processors are further configured to:

identify a reference parameter set corresponding to the reference parameter set identifier; and determine the activated parameter set based on the reference parameter set and a difference from the reference parameter set indicated by the delta information.

7. The UE apparatus of claim 1, wherein the parameter set configuration is an updated parameter set configuration, the parameter set is an updated parameter set, the activation condition is a currently-activation condition; and wherein the one or more processors are configured to activate the updated parameter set based on the currently-activation condition including switching from an older parameter set associated with a previous parameter set configuration to the parameter set associated with the updated parameter set configuration, the older parameter set associated with a previously-activation condition.

8. The UE apparatus of claim 1, wherein the one or more processors are further configured to:

transmit, to the network entity, parameter request information including the activation condition and one or more reference candidates; and wherein the one or more processors are configured to receive the parameter set configuration based on the parameter request information.

9. The UE apparatus of claim 1, wherein the activation condition includes at least one of:

a change to a monitored performance attribute;

a modification to a configuration of the UE apparatus or a network serving the UE apparatus;

a handover or mobility event associated with the UE apparatus; or a status change to a service associated with the UE apparatus or the network serving the UE apparatus.

10. A method of wireless communication by a user equipment (UE), comprising:

receiving, from a network entity, a parameter set configuration indicating one or more parameter sets corresponding to a model structure employed in a machine learning operation by the UE for the wireless communication, wherein the parameter set configuration does not include the one or more parameter sets;

transmitting, to the network entity and based on at least one of the one or more parameter sets indicated in the parameter set configuration not being stored at the UE, a request to receive the at least one of the one or more parameter sets from a model repository;

receiving, from the network entity and based on the request, the at least one of the one or more parameter sets from the model repository; and activating, based on an activation condition and for the machine learning operation, a parameter set of the one or more parameter sets.

11. The method of claim 10, further comprising:

detecting the activation condition;

identifying the parameter set associated with the activation condition; and transmitting, to the network entity, a notification that the parameter set has been activated.

12. The method of claim 10, further comprising:

detecting the activation condition;

identifying the parameter set associated with the activation condition;

transmitting, to the network entity, an activation request to activate the parameter set; and receiving, from the network entity and based on the activation request, an indication to activate the parameter set.

13. The method of claim 10, further comprising:

receiving an indication to activate the parameter set based on the network entity detecting the activation condition; and wherein activating the parameter set comprises activating the parameter set based on receiving the indication.

14. The method of claim 10, wherein the parameter set is an activated parameter set, the parameter set configuration includes a reference parameter set and delta information, and further comprising:

determining the activated parameter set based on the reference parameter set and a difference from the reference parameter set indicated by the delta information.

15. The method of claim 10, wherein the parameter set is an activated parameter set, the parameter set configuration includes a reference parameter set identifier and delta information, and further comprising:

identifying a reference parameter set corresponding to the reference parameter set identifier; and determining the activated parameter set based on the reference parameter set and a difference from the reference parameter set indicated by the delta information.

16. The method of claim 10, wherein the parameter set configuration is an updated parameter set configuration, the parameter set is an updated parameter set, the activation condition is a currently-activation condition; and wherein activating the updated parameter set is based on the currently-activation condition including switching from an older parameter set associated with a previous parameter set configuration to the parameter set associated with the updated parameter set configuration, the older parameter set associated with a previously-activation condition.

17. The method of claim 10, further comprising:

transmitting, to the network entity, parameter request information including the activation condition and one or more reference candidates; and receiving the parameter set configuration based on the parameter request information.

18. The method of claim 10, wherein the activation condition includes at least one of:

a change to a monitored performance attribute;

a modification to a configuration of the UE or a network serving the UE;

a handover or mobility event associated with the UE; or a status change to a service associated with the UE or the network serving the UE.

19. A method of wireless communication by a network entity, comprising:

transmitting, to a user equipment (UE), a parameter set configuration indicating one or more parameter sets corresponding to a model structure employed in a machine learning operation by the UE for wireless communication, wherein the parameter set configuration does not include the one or more parameter sets;

receiving, from the UE and based on at least one of the
one or more parameter sets indicated in the parameter
set configuration not being stored at the UE, a request
to receive the at least one of the one or more parameter
sets from a model repository;

transmit, to the UE and based on the request, the at least
one of the one or more parameter sets from the model
repository; and causing, based on an activation condition and for the
machine learning operation, activation of a parameter
set of the one or more parameter sets.

20. The method of claim 19, wherein the parameter set
configuration includes a reference parameter set and delta
information for generating the parameter set.

21. The method of claim 19, further comprising:

detecting the activation condition;

identifying the parameter set associated with the activa-
tion condition; and transmitting a parameter set identifier to the UE, the
parameter set identifier identifying the parameter set.

22. The method of claim 19, further comprising:

receiving, from the UE, parameter request information
including the activation condition and one or more
reference candidates; and transmitting the parameter set configuration based on the
parameter request information.

23. The method of claim 19, wherein the activation
condition includes at least one of:

a change to a monitored performance attribute;

a modification to a configuration of the UE or a network
serving the UE;

a handover or mobility event associated with the UE; or a status change to a service associated with the UE or the
network serving the UE.

24. An apparatus for wireless communication by a net-
work entity, comprising:

one or more memories; and one or more processors coupled with the one or more
memories and configured to:

transmit, to a user equipment (UE), a parameter set
configuration indicating one or more parameter sets
corresponding to a model structure employed in a machine learning operation by the UE for wireless
communication, wherein the parameter set configu-
ration does not include the one or more parameter
sets;

receive, from the UE and based on at least one of the
one or more parameter sets indicated in the param-
eter set configuration not being stored at the UE, a
request to receive the at least one of the one or more
parameter sets from a model repository;

transmit, to the UE and based on the request, the at least
one of the one or more parameter sets from the model
repository; and cause, based on an activation condition and for the
machine learning operation, activation of a param-
eter set of the one or more parameter sets.

25. The apparatus of claim 24, wherein the one or more
processors are further configured to:

detect the activation condition;

identify the parameter set associated with the activation
condition; and transmit a parameter set identifier to the UE, the param-
eter set identifier identifying the parameter set.

26. The apparatus of claim 24, wherein the parameter set
configuration includes a reference parameter set and delta
information for generating the parameter set.

27. The apparatus of claim 24, wherein the one or more
processors are further configured to:

receive, from the UE, parameter request information
including the activation condition and one or more
reference candidates; and transmit the parameter set configuration based on the
parameter request information.

28. The apparatus of claim 24, wherein the activation
condition includes at least one of:

a change to a monitored performance attribute;

a modification to a configuration of the UE or a network
serving the UE;

a handover or mobility event associated with the UE; or a status change to a service associated with the UE or the
network serving the UE.

* * * * *